United States Patent [19]

Mannheimer et al.

[11] Patent Number: 4,843,508
[45] Date of Patent: Jun. 27, 1989

[54] CLEANING CARTRIDGE FOR CLEANING THE DRIVE HEAD/DRIVE WHEEL OF A CARTRIDGE TAPE DRIVE SYSTEM

[75] Inventors: Lee R. Mannheimer, Westlake Village; DeRidder, A. Lody, Carson, both of Calif.

[73] Assignee: Perfectdata Corporation, Chatsworth, Calif.

[21] Appl. No.: 60,229

[22] Filed: Jun. 10, 1987

[51] Int. Cl.⁴ .............................. G11B 5/41
[52] U.S. Cl. ...................... 360/128; 360/130.3
[58] Field of Search ............ 360/128, 137, 132; 15/210 R

[56] References Cited

U.S. PATENT DOCUMENTS

| | | | |
|---|---|---|---|
| 3,761,994 | 10/1973 | Becht | 360/128 |
| 3,783,470 | 1/1974 | Myers | 15/210 R |
| 4,272,796 | 6/1981 | Van Kreuningen et al. | 360/128 |
| 4,458,281 | 7/1984 | Kara | 360/128 |
| 4,510,545 | 4/1985 | Boudreau | 360/128 |
| 4,631,614 | 12/1986 | Davis et al. | 360/128 |
| 4,698,712 | 10/1987 | Fritsch | 360/128 |

FOREIGN PATENT DOCUMENTS 52-18306 10/1977 Japan .................. 360/128

Primary Examiner—A. J. Heinz
Assistant Examiner—Andrew L. Sniezek
Attorney, Agent, or Firm—Spensley Horn Jubas & Lubitz

[57] ABSTRACT

A cleaning cartridge for cleaning the magnetic heads, tape scraper, and drive wheel of computer tape drives that use tape cartridges. The cleaning cartridge is adapted to be inserted into the tape drive and can simultaneously clean (1) the heads and tape scraper by rubbing a cleaning pad against the heads and the tape scraper in a direction that is perpendicular to the tape path and (2) the drive wheel by causing a second cleaning pad to move in a direction which horizontally intersects the tape path and contacts the drive wheel.

11 Claims, 2 Drawing Sheets

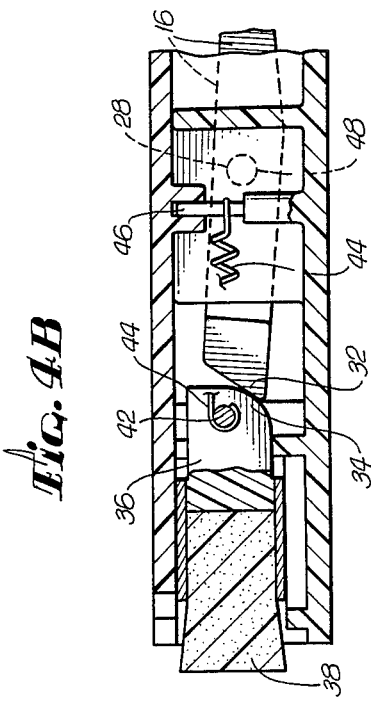
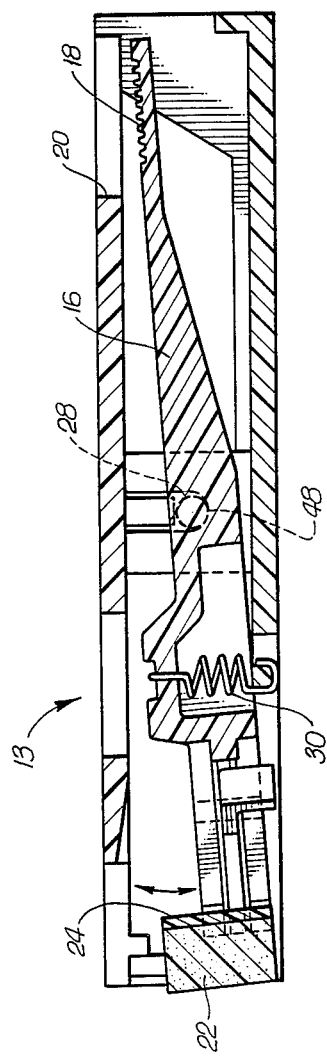
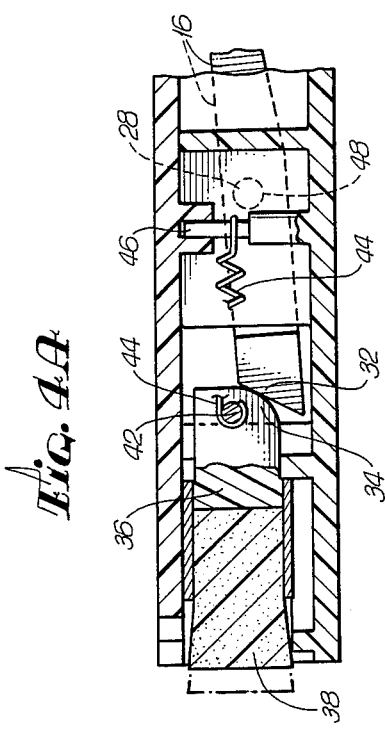

CLEANING CARTRIDGE FOR CLEANING THE DRIVE HEAD/DRIVE WHEEL OF A CARTRIDGE TAPE DRIVE SYSTEM

BACKGROUND OF THE INVENTION

The present invention relates to a cleaning cartridge for a cartridge tape drive system. Specifically, the present invention relates to a cleaning cartridge for cleaning the drive wheel and the magnetic read, write, and erase heads of cartridge tape drive systems.

Cartridge tape drive systems generally comprise a plurality of magnetic read, write and erase heads. The cartridge tape drive systems also generally comprise a drive wheel located proximate the magnetic heads, the drive wheel being adapted to move magnetic tape past the heads. In order to insure the accurate functioning of the magnetic heads, it is important for the magnetic heads to be maintained relatively free of particulate foreign matter. It is, therefore, generally desirable to periodically clean the magnetic heads of such cartridge tape drive systems. It is important for the magnetic heads to be cleaned without damaging or otherwise interfering with the operation of said magnetic heads.

Similarly, since the drive wheel contacts the magnetic tape in order to move the tape past the magnetic heads, it is desirable that the drive wheel also be maintained relatively free of foreign particulate matter. Particulate matter present on the drive wheel can be easily transferred from the drive wheel to the magnetic tape and from the magnetic tape to the magnetic heads and vice versa.

Many cartridge tape drive systems also employ a tape scraper which is located proximate the magnetic read, write and erase heads. The tape scraper also contacts the magnetic tape and, therefore, it is desirable that the tape scraper be maintained relatively free of foreign particulate matter in order to prevent contamination of the rest of the system.

Various cleaning devices have been proposed for cartridge drive systems, depending on the particular type of drive systems. For example, one type is often referred to as "streamer" or "streaming" mode and another is often called a "start-stop" mode drive. Streamer and start-stop drives are typically used to provide backup data storage for disc drive systems. An exemplary cleaning system for streamer tape drives is described in U.S. Pat. No. 4,631,614, issued Dec. 23, 1986, entitled "Tape Cartridge Drive Head Cleaner." The system of U.S. Pat. No. 4,631,614 is intended to clean the magnetic heads and tape scraper of such a drive system but is not believed to be generally effective in cleaning the drive wheel of the drive system. Therefore, foreign particulate matter present on the drive wheel can be relatively easily transferred to the magnetic heads. This often necessitates more frequent cleaning of the magnetic heads.

Other prior head cleaning devices have been developed for use with audio cassette and audio cartridge systems. Audio tape cleaning devices are generally designed to clean only the play head, leaving the other heads of the audio system untouched. When the heads of computer tape drive systems are to be cleaned it is necessary that all of the heads be cleaned in order to prevent faulty reading, writing, or erasing of information.

Various cartridge and cassette cleaners are described in U.S. Pat. Nos. 4,141,053 to Kara; 4,458,281 to Kara; 4,149,206 to Loiselle; 4,225,893 to Loiselle; 4,272,796 to Van Kreuningen, et al.; 3,761,994 to Becht; 3,783,470 to Myers et al.; and 3,955,214 to Post et al. Most of these devices use a horizontally pivoting cleaning arm or a rotating pulley and a cleaning pad which is attached to the arm or pulley. The Myers' system imparts a sliding motion to a cleaning pad. Thus, these devices use a motion that is parallel to the tape path for the cleaning action and are generally designed to clean only one magnetic head. This parallel cleaning motion has often been found to be ineffective for removing dirt from the corners of the magnetic heads. U.S. Pat. No. 4,272,796 to Van Kreuningen, et al., relates to a cleaning system which uses a combination of a vertical and a horizontal cleaning motion. This system is also designed to clean only one magnetic head at a time.

The patents issued to Post et al., Kara, Loiselle, and Van Kreuningen, et al. are designed to use the transport mechanism of an audio cassette deck to provide the motion of the cleaning pad. Therefore, these designs produce a rapid scrubbing motion across the head. This results in repeated rubbing of the play head. Although this motion should not damage the magnetic heads of the cassette unit, such repeated cleanings could damage the more delicate magnetic heads of a computer tape drive. Furthermore, these audio cleaning systems generally require power to be applied to the cassette deck. It is not always desirable to have power applied to computer tape drives while cleaning the heads of such drives.

The cleaning system described in U.S. Pat. No. 4,158,871, to Leaming, which is used for cleaning audio tape cartridge playback units, uses a shaft with a cotton swab or felt pad attached to the end of the shaft. The cartridge is inserted into the playback unit so the pad or swab may be rubbed against the playing head. If too much force is applied to the shaft, the magnetic heads may be damaged.

Other previous systems use abrasive cleaning pads or belts to rub the playing head to remove accumulated dirt. Repeated usage of abrasive pads or belts can cause damage to the magnetic heads.

SUMMARY OF THE INVENTION

It is an object of the present invention to provide a cleaning system which system can simultaneously clean the magnetic heads, drive wheel, and tape scraper of cartridge tape drive systems. This is achieved by providing a cartridge that is adapted to be inserted into a cartridge tape drive system which has a drive wheel and a plurality of magnetic heads arranged along a tape path. The cartridge is provided with a first cleaning pad for contacting the magnetic heads when the cartridge is inserted into the drive system. The first cleaning pad is attached to a manually operated actuator lever. Operation of the actuator lever causes the first cleaning pad to move in a vertical direction perpendicular to the tape path thus effecting the cleaning of the magnetic heads with such generally vertical movement.

The cartridge is also provided with a second cleaning pad for intermittently contacting the drive wheel when the cartridge is inserted into the drive system and the actuator lever operated. The second cleaning pad moves in a direction which allows it to contact the drive wheel. This movement is a result of the operation of the actuator lever. As the second cleaning pad intermittently contacts the drive wheel, the drive wheel is cleaned.

BRIEF DESCRIPTION OF THE DRAWINGS

In the drawings, wherein like numbers refers to corresponding components in the several figures:

FIG. 3 is a cross-section view of the cleaning cartridge taken along line 3—3 of FIG. 2;

FIG. 4a and 4b are cross-sectional views of the cleaning cartridge of the present invention taken along line 4—4 of FIG. 2. FIG. 4a represents the cleaning cartridge of the present invention when the actuator means is in its normal, non-actuated position. FIG. 4b represents the cleaning cartridge of the present invention when the actuator means is in a depressed, actuated position.

DETAILED DESCRIPTION OF THE ILLUSTRATED EMBODIMENTS

The following description is the best presently contemplated mode of carrying out the invention. This description is made for the purpose of illustrating the general principles of the invention and is not to be taken in a limiting sense. Those skilled in the art will appreciate other modes for carrying out the general principles of the invention.

Figure 1:
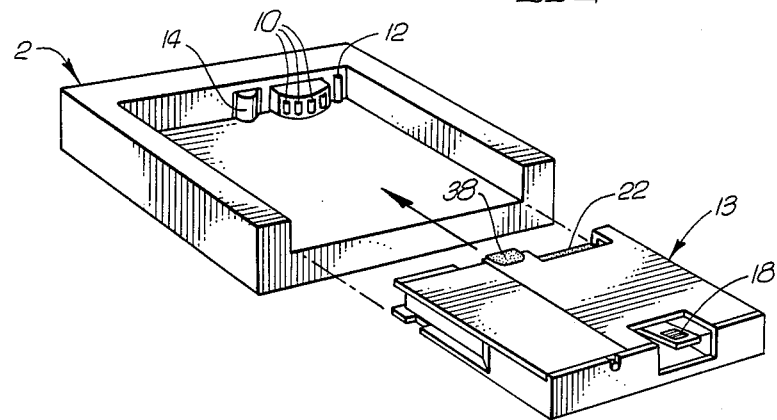
FIG. 1 is a perspective view of a computer tape drive unit.

FIG. 1 shows a computer tape drive 2 that uses tapes housed inside cartridges. Magnetic read, write, and erase heads 10, a tape scraper 12, and a drive wheel 14 are arranged along the tape path. Magnetic read, write and erase heads are generally manufactured in a relationship proximate to one another and contained in a single housing, thus forming a single head assembly. The magnetic heads 10 read data stored on the tape, write data onto the tape, and erase the tape. Tape scraper 12 dislodges dirt from the tape as the tape moves past it and drive wheel 14 is adapted to contact the tape and move said tape along the tape path. Although a magnetic tape cartridge is not shown, reference numeral 13 illustrates a cleaning cartridge in accordance with a preferred embodiment of the present invention. The exterior housing of cleaning cartridge 13 is similar to those of cartridges which ordinarily contain magnetic recording tape for use with computer tape drive 2.

Figure 2:
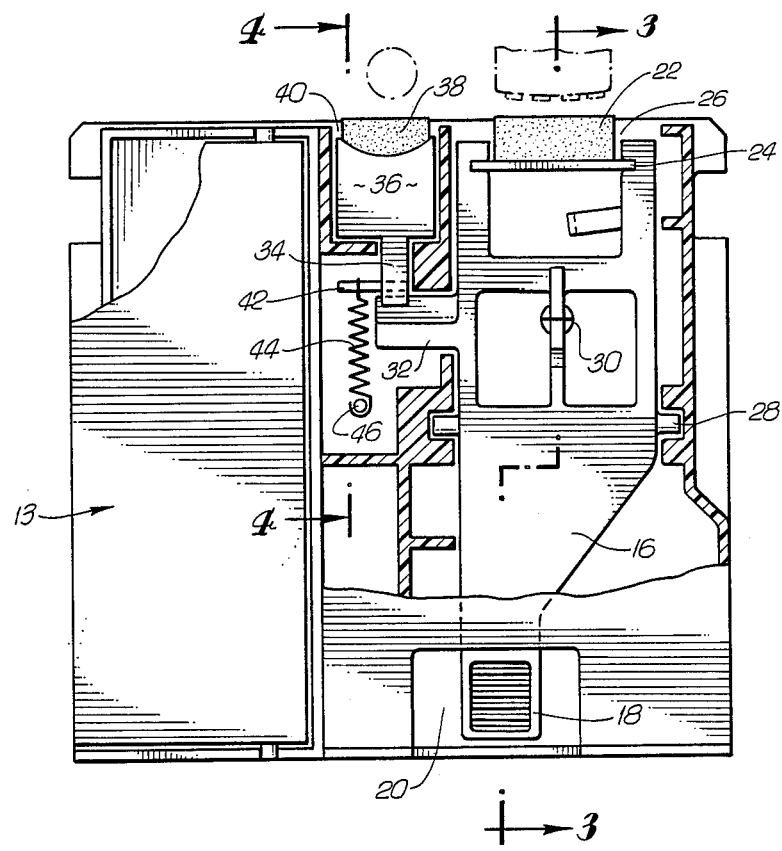
FIG. 2 is a plan view of the tape drive head cleaning cartridge the present invention.

FIG. 2 shows a top view of the cleaning cartridge 13 of FIG. 1. An actuator 16 for causing the functioning of the cleaning system of the present invention is located within the cleaning cartridge 13. One end of the actuator 16 comprises a lever arm 18 for manually operating the actuator 16. Lever arm 18 projects through an aperture 20 located in the cleaning cartridge 13. At the end of the actuator 16 opposite the lever arm 18 is located a head cleaning pad 22 for cleaning the heads of a computer tape drive. The head cleaning pad 22 is attached to a head cleaning pad holder 24 for holding the head cleaning pad 22 in a desirable location. The head cleaning pad holder 24 is removably attached to the actuator 16. The head cleaning pad 22 is adapted to extend through an opening 26 in the cleaning cartridge 13 and beyond the boundary plane of the cleaning cartridge 13 such that when the cleaning cartridge 13 is inserted into a computer tape drive, the cleaning pad 22 contacts the magnetic read, write and erase heads 10 and the tape scraper 12.

The actuator 16 is adapted to pivot about a pivot bar 28. As the actuator 16 is caused to pivot about the pivot bar 28 the head cleaning pad 22 is caused to move vertically in a direction which is generally perpendicular to the tape path. Since the head cleaning pad 22 is adapted to contact the magnetic heads 10 and the tape scraper 12 when the cleaning cartridge 13 is inserted to a computer tape drive, movement of the head cleaning pad 22 in a vertical direction generally perpendicular to the tape path causes the cleaning of the magnetic heads 10 and the tape scraper 12.

The actuator 16 is biased in relation to the pivot bar 28 by a spring 30. That is, the spring 30 is adapted to maintain the end of the actuator 16 opposite the lever arm 18 generally on one side of a plane which horizontally bisects the cleaning cartridge 13 while the lever arm 18 is maintained on the opposite side of said plane. In operation, the lever arm 18 is manually depressed thus causing the actuator 16 to pivot about the pivot bar 28 causing the end of the actuator 16 which is adapted to hold the head cleaning pad 22 to move out of its normally biased position. This pivoting action is described further in FIG. 3.

The actuator 16 further comprises an actuator slide cam 32 which is located in an operable relationship with a cleaner slide cam 34. The actuator slide cam 32 and the cleaner slide cam 34 cooperate to translate the vertical movement of the actuator 16 into a forward motion generally perpendicular to the vertical motion of the actuator 16. The cleaner slide cam 34 is attached to a drive wheel cleaning pad holder 36 which in turn holds a drive wheel cleaning pad 38 for contacting and cleaning the drive wheel. The drive wheel cleaning pad 38 is located proximate an opening 40 in the cleaning cartridge 13 and is adapted to terminate substantially co-planarly with the cleaning cartridge 13 when the actuator 16 is in its normal, biased position. Attached to drive wheel cleaning pad holder 36 is a spring pin 42 for providing a point of attachment for a spring 44. The spring 44 is tensioned between a spring pin 42 on one end and a post 46 on the other and maintains the cleaner slide cam 34 in operable contact with the actuator slide cam 32.

In operation, as the actuator 16 is caused to pivot about the pivot bar 28 the actuator slide cam 32 is caused to move vertically within the cleaning cartridge 13. As the actuator 16 pivots, the actuator slide cam 32 moves in an upward direction thus causing the cleaner slide cam 34 to move in an outward direction thus causing the drive wheel cleaning pad 38 to contact the drive wheel 14. As the actuator 16 is allowed to return to its normal biased position, the actuator slide cam 32 moves in a downward direction thus allowing the cleaner slide cam 34 to move in an inward direction due to the tensioning effect of the spring 44 thus causing the drive wheel cleaning pad 38 to return to a position such that drive wheel cleaning pad 38 terminates substantially co-planarly with the cleaning cartridge 13. The operation of the actuator slide cam 32 and the cleaning slide cam 34 in relationship to the drive wheel cleaning pad 38 is set forth in more detail in FIGS. 4a and 4b.

The drive wheel cleaning pad 38 and the head cleaning pad 22 are made of a soft and absorbent material capable of being saturated with a cleaning fluid. Preferably, the pads are made from a white or other light colored material so that an operator may easily tell when the pads need to be replaced by checking said pads for discoloration. The cleaning pad should also be relatively resistant to wear so that it will not deteriorate during cleaning. The cleaning pad should be relatively soft so that they do not damage the drive wheel 14, the magnetic heads 10 or the tape scraper 12.

All the parts of the cleaning cartridge 13 other than the head cleaning pad 22 and the drive wheel cleaning pad 38 are suitably manufactured from a metal or thermoplastic or thermosetting resinous material. Due to factors such as weight, cost, and the like, it is desirable that the parts of cleaning cartridge 13 other than the pads 22 and 38 and the springs 30 and 44 be manufactured from a thermoplastic resinous material. Exemplary of such thermoplastic resinous materials are styrene, polycarbonate, nylon, ABS, and the like. The cleaning pads 22 and 38 are suitably made of polyurethane foam or a lint free absorbent fabric or a combination of foam and lint free absorbent fabric. The springs 30 and 44 are suitably made of metal.

If it is desired to saturate the cleaning pads 22 and 38 with a cleaning solution, suitable cleaning solutions include any solution which has solvent properties which render it capable of dissolving contaminants commonly found on magnetic heads, and which does not leave a residue on the magnetic heads or damage said heads or other parts of computer tape drives. Exemplary of such cleaning solutions are isopropyl alcohol, or a mixture of isopropyl alcohol and a fluorocarbon such as freon.

FIG. 3 represents a cross-sectional view of the cleaning cartridge of the present invention taken along line 3—3 of FIG. 2. FIG. 3 illustrates the actuator 16 located within the cleaning cartridge 13. The actuator 16 is shown in a normally biased position and is maintained in said normally biased position by the spring 30 which causes the actuator 16 to pivot about the pivot bar 28 and a pivot point 48. When the lever arm 18 is manually depressed, the actuator 16 pivots about the pivot bar 28 and the pivot point 48 thus causing the head cleaning pad 22 to move vertically within the cleaning cartridge 13. When the lever arm 18 is released, the spring 30 causes the actuator 16 to pivot about the pivot bar 28 and the pivot point 48 thus causing the actuator 16 to assume its normally biased position. By alternately manually depressing and releasing the lever arm 18, the head cleaning pad 22 is caused to move up and-down vertically within the cleaning cartridge 13. When the cleaning cartridge 13 is located within a computer tape drive, this action causes the head cleaning pad 22 to move in a direction which is substantially perpendicular to the tape path and since the head cleaning pad 22 is adapted to contact the magnetic heads 10 and the tape scraper 12 this perpendicular motion results in the cleaning of the magnetic heads 10 and the tape scraper 12.

FIGS. 4a and 4b demonstrate the operation of the cleaner slide cam 34 and the actuator slide cam 32. As can be seen in FIG. 4a, when the actuator 16 is in its normal biased position the drive wheel cleaning pad 38 terminates substantially co-planarly with the cleaning cartridge 13. Moreover, the actuator slide cam 32 is in contact with the cleaner slide cam 34 due to the tensioning force of spring 44. As the lever arm 18 is manually depressed and the actuator 16 is caused to pivot about the pivot bar 28 and the pivot point 48, the actuator slide cam 32 is caused to move substantially vertically within cleaning cartridge 13 and in a manner which causes the cleaner slide cam 34 to move along the sloping surface of the actuator slide cam 32 thus causing the cleaner slide cam 34, the drive wheel cleaning pad holder 36, and the drive wheel cleaning pad 38 to move in an outward direction from the cleaning cartridge 13.

FIG. 4b illustrates the location of the actuator 16, the actuator slide cam 32, the cleaner slide cam 34, the drive wheel cleaning pad holder 36 and the drive wheel cleaning pad 38 when the lever arm 18 is in a depressed position. By manually depressing and releasing the lever arm 18, the drive wheel cleaning pad 38 is caused to intermittently contact the drive wheel 14 thus causing the cleaning of the drive wheel 14. As set forth above, the drive wheel cleaning pad 38 is made of a soft absorbent material which may or may not be saturated with a cleaning solution.

In summary, the present invention provides a system which permits convenient simultaneous cleaning of the magnetic heads, tape scraper, and drive wheel of a tape drive system by a head cleaning pad that is moved perpendicularly to the tape path and a drive wheel cleaning pad which is adapted to horizontally intersect the tape path and contact the drive wheel. The vertical motion of the head cleaning pad is provided by employing a manually activated pivoting arm and the forward motion of the drive wheel cleaning pad is provided through a cam action which translates the vertical movement of the pivoting arm into a forward horizontal movement of the drive wheel cleaning pad. It is understood that the drive wheel cleaning pad could contact the drive wheel from a variety of directions and that such contact could be effected in a variety of manners.

The foregoing description is meant to be illustrative only and is not intended to limit, in any manner, the scope of the present invention as defined by the following claims.

What is claimed is:

1. A cleaning cartridge for use with a cartridge tape drive system having a drive wheel and a plurality of magnetic heads arranged along a tape path, comprising:
    a cartridge housing that is adapted for insertion into the drive system and includes a first opening that is adjacent to the heads when the cartridge is inserted into the drive system and a second opening that is adjacent to the drive wheel when the cartridge is inserted into the drive system;
    a first cleaning pad mounted in the cartridge, which pad is adapted for contacting each of the heads when the cartridge is inserted into the drive system;
    a second cleaning pad mounted in the cartridge, which pad is adapted for moving upon actuation thereof into contact with the drive wheel after the cartridge is inserted into the drive system; and
    an actuator secured within the cartridge for simultaneously moving the first cleaning pad in a direction that is substantially perpendicular to the tape path and for actuating the second cleaning pad into contact with the drive wheel, thereby causing the first cleaning pad to clean the heads, and the second cleaning pad to clean the drive wheel.

2. The cleaning cartridge of claim 1 wherein the tape drive has a tape scraper arranged along the tape path and wherein the first cleaning pad is adapted to contact the tape scraper when the cartridge is inserted into the drive system.

3. The cleaning cartridge of claim 1 wherein the actuator is manually operated.

4. The cleaning cartridge of claim 1 wherein the actuator comprises a lever arm which pivots about an axis wherein said pivoting causing the first cleaning pad to move in a direction that is substantially perpendicular to the tape path.

5. The cleaning cartridge of claim 4 wherein the lever arm comprises an actuator slide cam which moves with the lever arm.

6. A cleaning cartridge for use with a cartridge tape drive system having a drive wheel and a plurality of magnetic heads arranged along a tape path, comprising:
a cartridge housing that is adapted for insertion into the drive system and includes a first opening that is adjacent to the heads when the cartridge is inserted into the drive system and a second opening that is adjacent to the drive wheel when the cartridge is inserted into the drive system;
a first cleaning pad mounted in the cartridge, which pad is adapted for contacting each of the heads when the cartridge is inserted into the drive system;
a second cleaning pad mounted in the cartridge, which pad is adapted for moving upon actuation thereof into contact with the drive wheel after the cartridge is inserted into the drive system; and
actuator means secured within the cartridge for simultaneously moving the first cleaning pad in a direction that is substantially perpendicular to the tape path and for actuating the second cleaning pad into contact with the drive wheel thereby causing the first cleaning pad to clean the heads, and the second cleaning pad to clean the drive wheel, said actuator means comprising a lever arm which pivots about an axis wherein said pivoting causes the first cleaning pad to move in a direction that is substantially perpendicular to the tape path, said lever arm comprising an actuator slide cam which moves with the lever arm, wherein the cleaning cartridge further comprises a cleaner slide cam which cooperates with the actuator slide cam to cause the second cleaning pad to intersect the tape path.

7. The cleaning cartridge of claim 1 wherein the first and second cleaning pads are made of a porous material which can be saturated with a cleaning fluid.

8. A cleaning cartridge for use with a cartridge tape drive system having a drive wheel and a plurality of magnetic heads arranged along a tape path, comprising:
a cartridge housing that is adapted for insertion into the drive system and includes a first opening that is adjacent to the heads when the cartridge is inserted into the drive system and a second opening that is adjacent to the drive wheel when the cartridge is inserted into the drive system;
a first cleaning pad supported in the area of the first opening, which pad is adapted for contacting each of the heads when the cartridge is inserted into the drive system;
a second cleaning pad supported in the area of the second opening, which pad is adapted for moving upon actuation thereof into contact with the drive wheel after the cartridge is inserted into the drive system; and
an actuator secured within the cartridge for simultaneously moving the first cleaning pad in a direction that is substantially perpendicular to the tape path and for actuating the second cleaning pad into contact with the drive wheel in a direction that intersects the tape path thereby causing the first cleaning pad to clean the heads, and the second cleaning pad to clean the drive wheel.

9. A cleaning cartridge for use with a cartridge tape drive system having a drive wheel and a plurality of magnetic heads arranged along a tape path, comprising:
a cartridge housing that is adapted for insertion into the drive system and includes a first opening that is adjacent to the heads when the cartridge is inserted into the drive system and a second opening that is adjacent to the drive wheel when the cartridge is inserted into the drive system;
a first cleaning pad supported in the area of the first opening, which pad is adapted for contacting each of the heads when the cartridge is inserted into the drive system;
a second cleaning pad supported in the area of the second opening, which pad is adapted for contacting the drive wheel when the cartridge is inserted into the drive system; and
actuator means comprising (i) a lever arm which pivots about an axis wherein said pivoting causes the first cleaning pad to move in a direction that is substantially perpendicular to the tape path, (ii) an actuator slide cam which moves vertically with the lever arm, and (iii) a cleaner slide cam which cooperates with the actuator slide cam to cause the second cleaning pad to clean the drive wheel.

10. A method for simultaneously cleaning the magnetic heads and drive wheel of a cartridge tape drive system, the steps of the method comprising:
inserting a cleaning cartridge into the drive system, the cleaning cartridge comprising (i) a cartridge housing that is adapted for insertion into the drive system and includes a first opening that is adjacent to the heads when the cartridge is inserted into the drive system and a second opening that is adjacent to the drive wheel when the cartridge is inserted into the drive system, (ii) a first cleaning pad mounted in the cartridge and adapted for contacting the magnetic heads when the cleaning cartridge is inserted into the drive system, (iii) a second cleaning pad mounted in the cartridge and adapted for moving upon actuation thereof into contact with the drive wheel after the cleaning cartridge is inserted into the drive system, and (iv) an actuator secured within the cartridge for simultaneously moving the first cleaning pad in a direction that is substantially perpendicular to the tape path and for moving the second cleaning pad in a direction which intersects the tape path; and
actuating the actuator, whereby the first cleaning pad cleans the magnetic head and the second cleaning pad simultaneously cleans the drive wheel.

11. The method of claim 10 wherein the actuator is manually operated.

* * * * *